United States Patent [19]
Gimpel et al.

[11] Patent Number: 5,953,903
[45] Date of Patent: Sep. 21, 1999

[54] INTEGRAL ENGINE BURN-THROUGH DETECTION SYSTEM

[75] Inventors: Glen A. Gimpel, Lake Park; John R. Sech, Palm City, both of Fla.

[73] Assignee: United Technologies Corporation, Hartford, Conn.

[21] Appl. No.: 08/997,100

[22] Filed: Dec. 23, 1997

[51] Int. Cl.$^6$ .................................................. F02K 1/12

[52] U.S. Cl. .......................................... 60/223; 60/39.091

[58] Field of Search ................... 60/223, 242, 39.091, 60/39.33; 239/265.39, 265.41

[56] References Cited

U.S. PATENT DOCUMENTS

| | | | |
|---|---|---|---|
| 2,742,756 | 4/1956 | Boisblanc | 60/223 |
| 2,761,282 | 9/1956 | Allen | 60/223 |
| 2,799,136 | 7/1957 | Boisblanc | 60/223 |

*Primary Examiner*—Louis J. Casaregola
*Attorney, Agent, or Firm*—Christopher T. Hayes

[57] ABSTRACT

A responder mounted to the exhaust nozzle support structure of a gas turbine engine includes a pressure switch and a sensor tube connected thereto. The sensor tube encircles the nozzle flaps seals in spaced relation thereto, and the pressure switch is connected to a fire warning alarm.

3 Claims, 4 Drawing Sheets

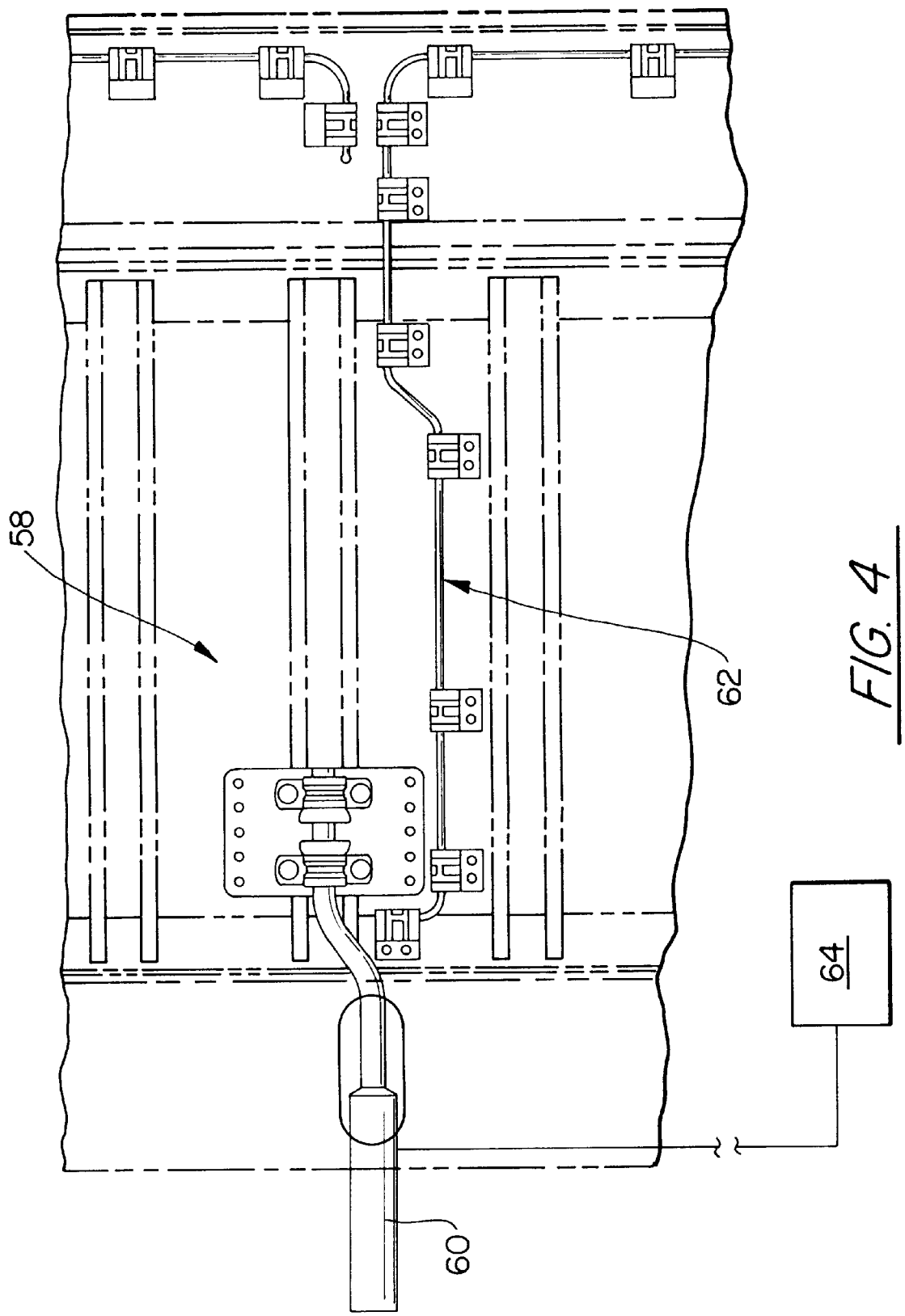

INTEGRAL ENGINE BURN-THROUGH DETECTION SYSTEM

TECHNICAL FIELD

This invention relates to aircraft engines of the turbine type of power plant and particularly to a method of detecting engine burn through in such power plants in aircraft.

BACKGROUND ART

This invention is particularly concerned with military aircraft as opposed to civilian or commercial aircraft and even more particularly to the class of aircraft that would fall in the fighter class. Fighter aircraft are typically powered by after-burning gas turbine engines that produce thrust by compressing air in a compressor section, adding fuel to the air and burning it in a combustor section to produce combustion products. The combustion products then flow through a turbine section which drives the compressor section, and the combustion products then exit the engine through a variable area, convergent/divergent exhaust nozzle. To boost the engine's thrust for brief periods, most fighter aircraft engines incorporate an augmentor in an augmentor duct located between the turbine section and the exhaust nozzle. When maximum thrust is desired, large amounts of fuel are fed into the augmentor duct and burned immediately downstream of the engine's turbines section. Although this "after-burning" produces a desirable increase in thrust, it also exposes the exhaust nozzle, and particularly the flaps and seals in the convergent section of the exhaust nozzle, to combustion gas that is at temperatures well beyond that necessary to burn through the flaps and seals.

To prevent such burn-through, cooling air is provided to the flaps and seals to maintain their temperature at an acceptable level. This cooling air flows to the flaps and seals from an annular cavity between the augmentor duct and the augmentor liner to another cavity between the flaps and seals and the nozzle support structure radially outward therefrom. Although this type of cooling scheme has proven to be quite effective, burn-through of the flaps or seals during augmentor operation can still occur.

Usually, a burn-through at the nozzle flaps or seals results from a loss of cooling air. This loss in cooling air leads to a hardware anomaly, loss of combustion gas containment, increase in nozzle hardware temperature and subsequent fire. Since propagation of the fire proceeds at an extremely rapid rate until after-burning is terminated, response time is critical.

Currently, detection of a nozzle burn through occurs by an airfield tower report, a wingman report, a noticeable loss in thrust, or by burn-through detector systems mounted on the aircraft's airframe. Unfortunately, by the time any of these detection methods notifies the pilot of the burn-through, a significant safety risk is present. In addition, considerable engine/airframe hardware damage is likely to have occurred before the pilot terminates afterburning.

What is needed is an integral gas turbine engine augmentor nozzle burn-through detection system that reduces pilot response time compared to current methods.

SUMMARY OF THE INVENTION

It is therefore an object of the present invention to provide an integral gas turbine engine augmentor nozzle burn-through detection system that reduces pilot response time compared to current methods.

Another object of the present invention is to provide immediate pilot warning, independent of visual assistance, of a gas turbine engine augmentor nozzle burn-through condition.

According to the present invention, a responder mounted to the exhaust nozzle support structure includes a pressure switch and a sensor tube connected thereto. The sensor tube encircles the nozzle flaps seals in spaced relation thereto, and the pressure switch is connected to a fire warning alarm.

The foregoing and other features and advantages of the present invention will become more apparent from the following description and accompanying drawings.

BRIEF DESCRIPTION OF DRAWINGS

FIG. 4 is a plan view of the responder of the present invention taken along line 4—4 of FIG. 3.

BEST MODE FOR CARRYING OUT THE INVENTION

Figure 1:
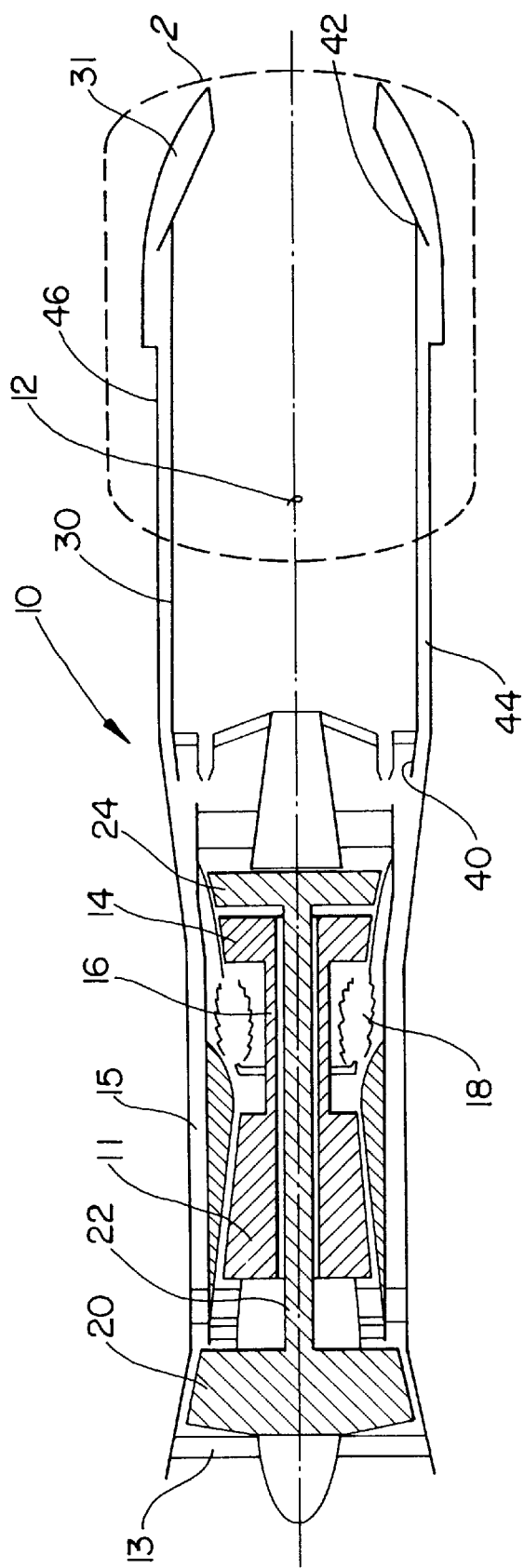
FIG. 1 is a plan view representing a typical gas turbine power plant.

As is shown schematically in FIG. 1, the gas turbine power plant generally indicated by reference numeral 10 and having a longitudinal axis 12 defined therethrough includes an engine inlet 13, a gas generator section including a high pressure compressor 11 in spaced relation to a high pressure turbine 14, and the high pressure compressor 11 and the high pressure turbine 14 are interconnected by a high speed shaft 16. A gas generator burner 18 is disposed therebetween and serves to combust fuel to energize the engine's working medium. The fan and low pressure compressor 20 is in spaced relation to the low pressure turbine 24, and the fan and low pressure compressor 20 is connected to the low pressure turbine 24 by a low speed shaft 22. As used herein, the term "turbine section" refers collectively to the high pressure turbine 14 and the low pressure turbine 24. The high pressure compressor 11 and the high pressure turbine 14 are disposed between the low pressure compressor 20 and the low pressure turbine 24. The high pressure spool and low pressure spool are located between the inlet 13 and a variable area exhaust nozzle 31. The low pressure spool and the high pressure spool are not mechanically connected to each other but rotate independently.

The engine also includes a bypass duct 15, and a cylindrical augmentor liner 30 in spaced relation to the gas generator burner 18, and has a first end 40 in spaced relation to a second end 42. The turbine section is disposed between the first end 40 and the gas generator burner 18, and the second end 42 is located immediately adjacent to the exhaust nozzle 31. As shown in FIG. 1, the augmentor liner 30 is coaxial with the longitudinally extending axis 12, and receives the engine's working medium discharging from the low pressure turbine 24.

Ultimately, the engine's working medium is discharged from the engine through the variable area exhaust nozzle 31. The fan 20 draws air through the inlet 13 and supplies a first portion of the air to the bypass duct 15 and a second portion of the air to the high pressure compressor 11. As shown in FIG. 1, the bypass duct 15 is located radially outward from the high pressure compressor 11, the burner 18, and the high pressure turbine 14 and serves to bypass a portion of air around the high pressure compressor 11, the burner 18, and the high pressure turbine 14, and to a first cavity between the augmentor liner 30 and the augmentor duct 46.

Figure 2:
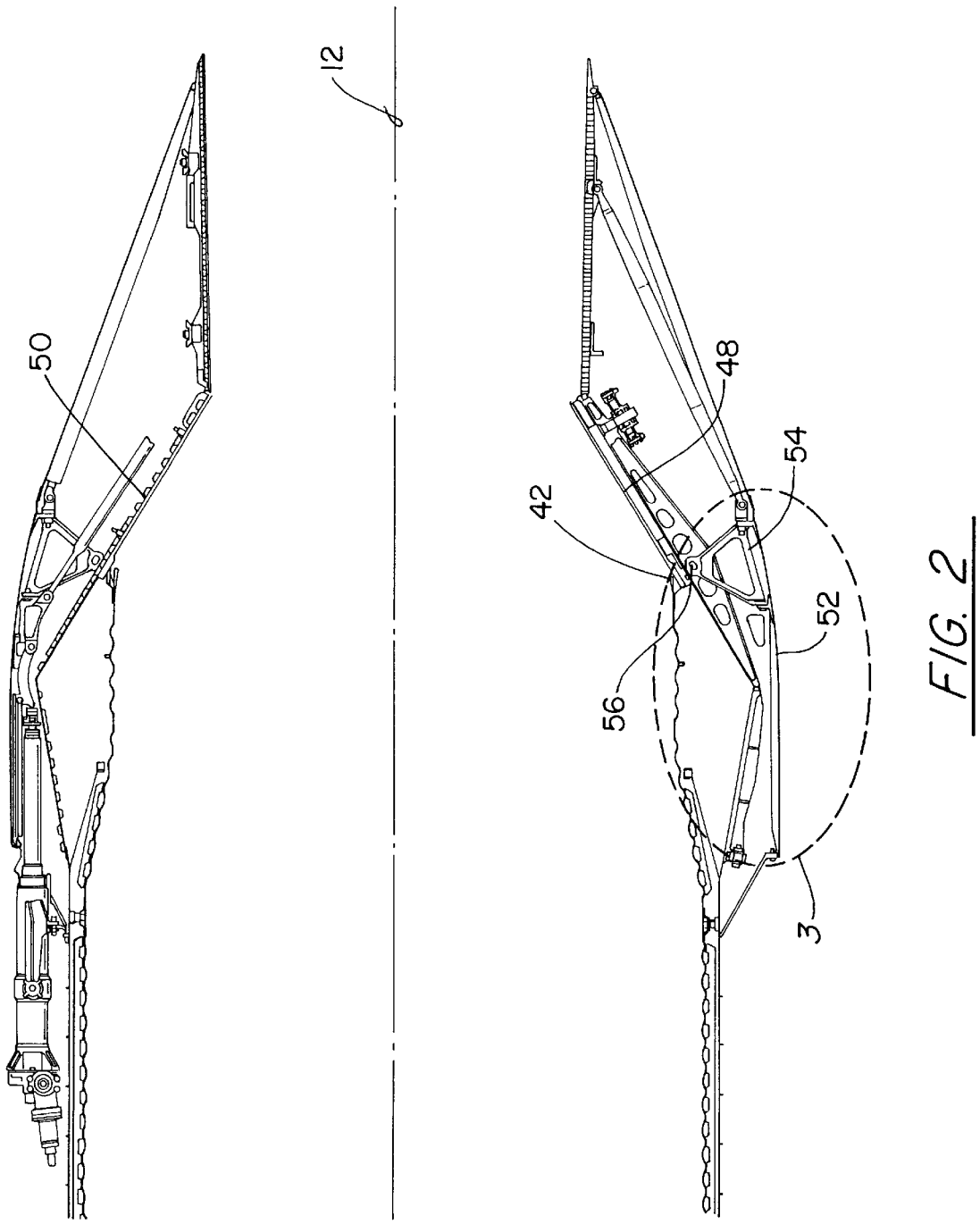
FIG. 2 is an enlarged view of the augmentor duct, exhaust nozzle, and nozzle support structure taken along line 2—2 of FIG. 1.

The exhaust nozzle 31 includes a plurality of flaps 48 and seals 50 spaced circumferentially about the second end 42 of the augmentor liner 30. (Although for purposes of clarity only one flap 48 and one seal 50 are shown in FIG. 2, it is to be understood that the flaps 48, and the seals 50 that extend between them, surround the second end 42 of the augmentor liner 30.) Located radially outward of the exhaust nozzle flaps 48 and seals 50 is an exhaust nozzle support structure 52. The nozzle support structure 52 includes a plurality of flap supports 54, and each flap support 54 is radially outward from one of the flaps 48. Each of the flap supports 54 includes a pivot 56, and each of the flaps 48 is connected to one of the flap supports 54 at one of the pivots 56.

Figure 3:
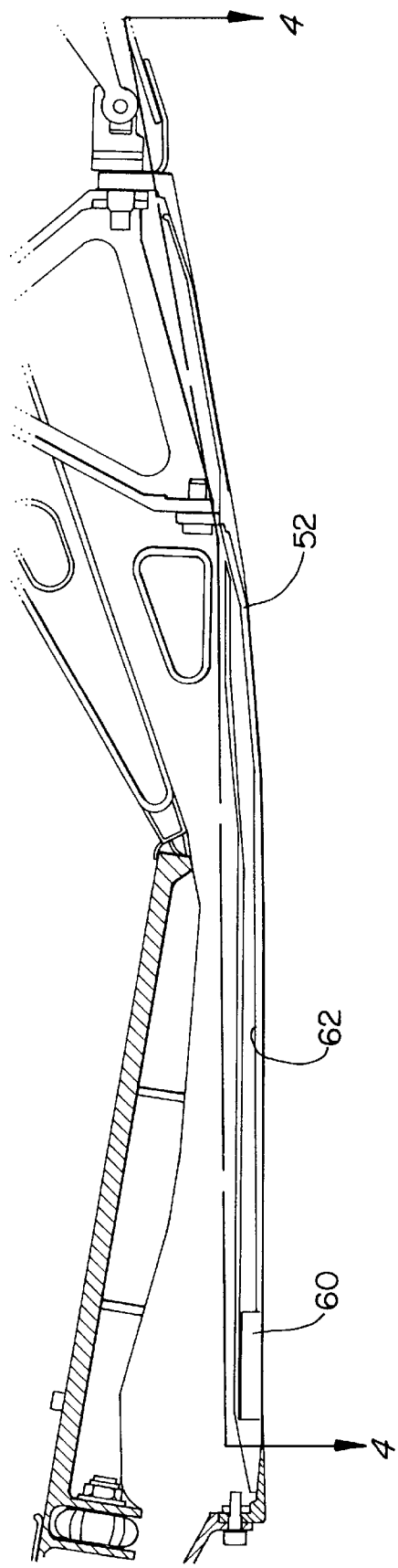
FIG. 3 is a further enlarged view of the augmentor duct, exhaust nozzle, and nozzle support structure taken along line 3—3 of FIG. 2.

As shown in FIG. 3 and 4, the present invention includes a responder 60 fixedly mounted to the nozzle support structure 52. The responder 60 has a pressure switch 60 that is connected to a sensor tube 62, and the sensor tube 62 is attached at intervals along the length thereof to the exhaust nozzle support structure 52. The sensor tube 62 is filled with helium, and extends about the nozzle support structure 52 radially outward from each of the pivots 56. The sensor tube 62 thus encircles the flaps 48 and seals 50, but is in spaced relation thereto. The pressure switch 60 is normally open, but closes with either a predetermined increase or decrease in pressure. A fire warning alarm 64 is connected to the pressure switch 60 so that when the pressure switch 60 closes, the alarm sounds immediately.

When the sensor tube 62 is subjected to a threshold temperature produced by a small burn-through at a nozzle flap 48 or seal 50, helium expansion within the sensor tube 62 actuates the pressure switch 60, completing the circuit that activates the fire warning alarm 64 (located within the airframe cockpit). In the case of a more severe burn-through of a flap 48 or seal 50, burn-through of the sensor tube 62 will typically occur as well. When this occurs, pressure loss actuates the pressure switch 60, and again the circuit that activates the fire warning alarm 64 is completed. In either case, the fire warning alarm 64 is activated immediately after damage to the nozzle support structure 52 begins. By providing immediate notification of a burn-through, the pilot is able to take the necessary action (i.e. terminate augmentation and return to base) to ensure personal safety and minimize engine/airframe hardware damage.

Although this invention has been shown and described with respect to detailed embodiments thereof, it will be understood by those skilled in the art that various changes in form and detail thereof may be made without departing from the spirit and scope of the claimed invention.

We claim:

1. A gas turbine engine comprising:

a gas generator burner having a longitudinally extending axis defined therethrough, a cylindrical augmentor duct in spaced relation to said gas generator burner, said duct coaxial with said longitudinally extending axis and having a first end in spaced relation to a second end, a turbine section disposed between said gas generator burner and said first end of said augmentor duct, an exhaust nozzle located immediately adjacent to said second end of said duct, said exhaust nozzle including a plurality of flaps and seals spaced circumferentially about said second end of said duct an exhaust nozzle support structure located radially outward from each of said flaps, said nozzle support including a plurality of flap supports, each of said flap supports includes a pivot, and each of said flaps is connected to one of said flap supports at one of said pivots, a responder mounted to said support structure, said responder including a pressure switch and a sensor tube connected thereto, said sensor tube encircling said flaps and in spaced relation thereto, and a fire warning alarm connected to said pressure switch.

2. The gas turbine engine of claim 1 wherein said tube is located radially outward from each of said pivots.

3. The gas turbine engine of claim 2 wherein said tube is filled with helium.

* * * * *